United States Patent
Terazono et al.

(10) Patent No.: US 8,390,641 B2
(45) Date of Patent: Mar. 5, 2013

(54) DEVICE AND METHOD FOR MULTICOLOR VECTOR IMAGE PROCESSING

(75) Inventors: Kohei Terazono, Kawasaki (JP); Satoshi Iwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/185,604

(22) Filed: Jul. 19, 2011

(65) Prior Publication Data

US 2011/0273467 A1 Nov. 10, 2011

Related U.S. Application Data

(63) Continuation of application No. PCT/JP2009/000758, filed on Feb. 23, 2009.

(51) Int. Cl.
G06T 1/00 (2006.01)
G06T 11/00 (2006.01)
G09G 5/00 (2006.01)
G06K 9/48 (2006.01)
G06K 9/40 (2006.01)
G06K 9/00 (2006.01)
G06F 17/00 (2006.01)

(52) U.S. Cl. ........ 345/589; 345/418; 345/606; 345/611; 345/470; 382/162; 382/199; 382/254; 382/266; 382/274; 715/247

(58) Field of Classification Search .......... 345/418, 345/441–443, 467, 470, 469.1, 522, 581, 345/589, 593, 600, 606, 611, 619; 382/162, 382/193, 199, 254, 266–269, 282, 293, 274, 382/276; 715/243–247

See application file for complete search history.

(56) References Cited

U.S. PATENT DOCUMENTS

| 5,487,172 | A  | * | 1/1996  | Hyatt .......................... 712/32 |
| 6,295,073 | B1 |   | 9/2001  | Shigenaga |
| 8,055,065 | B2 | * | 11/2011 | Allen .......................... 382/162 |
| 2008/0187242 | A1 | * | 8/2008 | Kondo ........................ 382/289 |
| 2009/0097765 | A1 | * | 4/2009 | Kimura et al. ............... 382/243 |
| 2009/0297024 | A1 | * | 12/2009 | Dai ............................. 382/165 |

FOREIGN PATENT DOCUMENTS

| EP | 0964367    | 12/1999 |
| JP | 60-163164  | 8/1985  |
| JP | 61-112283  | 5/1986  |

(Continued)

OTHER PUBLICATIONS

English Abstract and Machine Translation of Japanese Reference 8-305865, Jul. 20, 2011.
English Abstract and Machine Translation of Japanese Reference 5-314271, Jul. 20, 2011.
English Abstract and Machine Translation of Japanese Reference 5-143743, Jul. 20, 2011.

(Continued)

Primary Examiner — Wesner Sajous
(74) Attorney, Agent, or Firm — Staas & Halsey LLP

(57) ABSTRACT

An image processing device includes: an analysis unit to analyze vector image data including line information and area color information; a detection unit to detect a boundary pixel through which an outline passes; a determination unit to determine whether the outline passes longitudinally through the boundary pixel; and a coloring unit to sequentially fill each pixel on a scan line. A color of a target pixel is calculated based on the area color information and the target pixel is filled with the calculated color when the target pixel is a boundary pixel. A reference filling color is changed from the first color to the second color defined for a target pixel when the target pixel is a boundary pixel through which an outline passes longitudinally. A target pixel is filled with the reference filling color when the target pixel is not a boundary pixel.

8 Claims, 14 Drawing Sheets

FOREIGN PATENT DOCUMENTS

| | | |
|---|---|---|
| JP | 1-296389 | 11/1989 |
| JP | 4-117581 | 4/1992 |
| JP | 5-35879 | 2/1993 |
| JP | 5-143742 | 6/1993 |
| JP | 5-143743 | 6/1993 |
| JP | 5-314271 | 11/1993 |
| JP | 6-4679 | 1/1994 |
| JP | 8-305865 | 11/1996 |
| JP | 2681367 | 8/1997 |
| JP | 2000-67254 | 3/2000 |
| JP | 3249096 | 11/2001 |
| JP | 2002-56395 | 2/2002 |
| JP | 2006-209654 | 8/2006 |

OTHER PUBLICATIONS

International Search Report mailed Mar. 17, 2009 issued in corresponding International Patent Application No. PCT/JP2009/000758.

International Preliminary Report on Patentability mailed Sep. 22, 2009 issued in corresponding International Patent Application No. PCT/JP2009/000758.

International Search Report for PCT/JP2009/000758, Mailed Mar. 17, 2009.

Japanese Office Action issued Apr. 10, 2012 in corresponding Japanese Patent Application No. 2011-500363.

\* cited by examiner

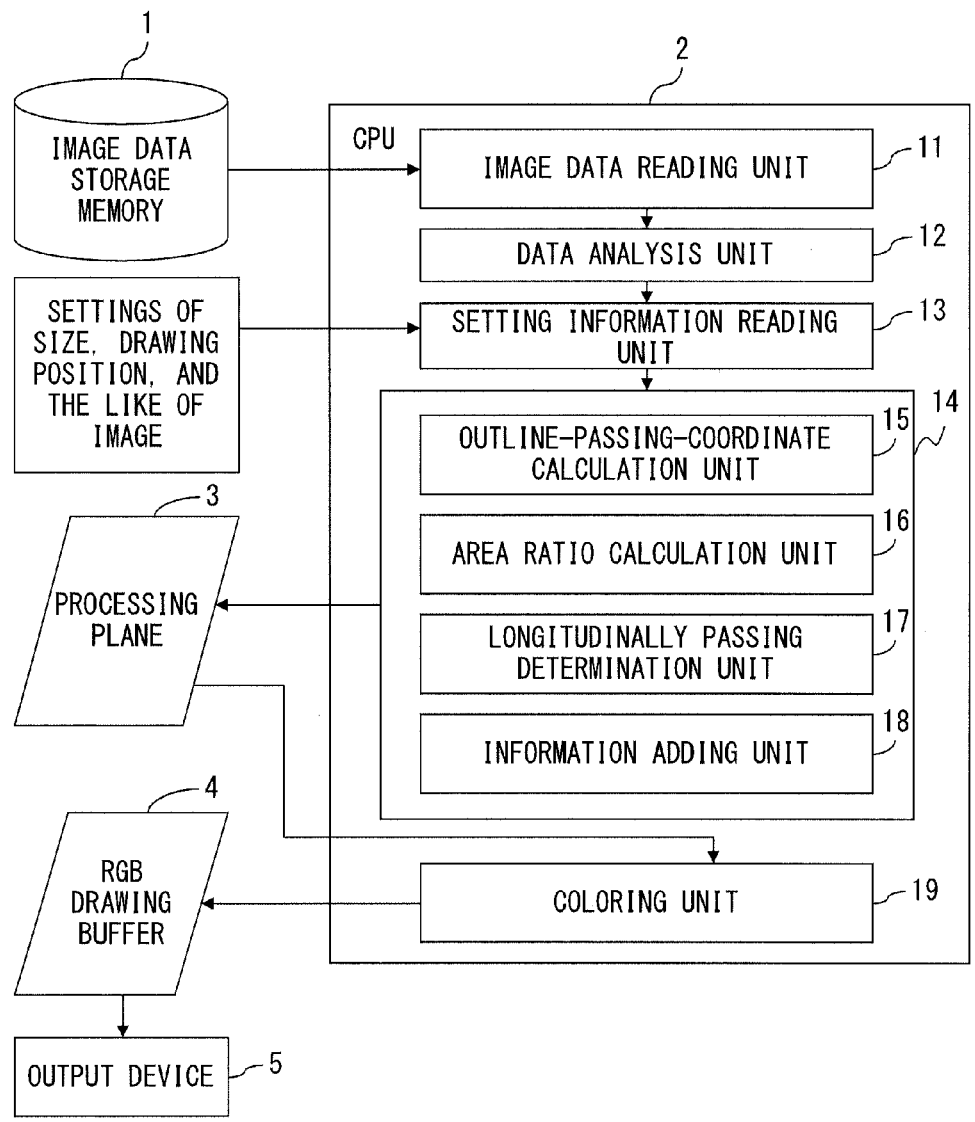
F I G. 1

```
<POINT>
    0        20      210
    1       100      160
    2       100       10
    3       180      210
<AREA>
    0       BACK
    1       255        0        0
    2       255      255        0
    3         0      255      255
<LINE>
    0       STRAIGHT    0    2    0    1
    1       STRAIGHT    1    2    1    2
    2       STRAIGHT    2    3    0    2
    3       STRAIGHT    0    1    1    3
    4       STRAIGHT    1    3    2    3
    5       STRAIGHT    0    3    3    0
```

F I G. 4

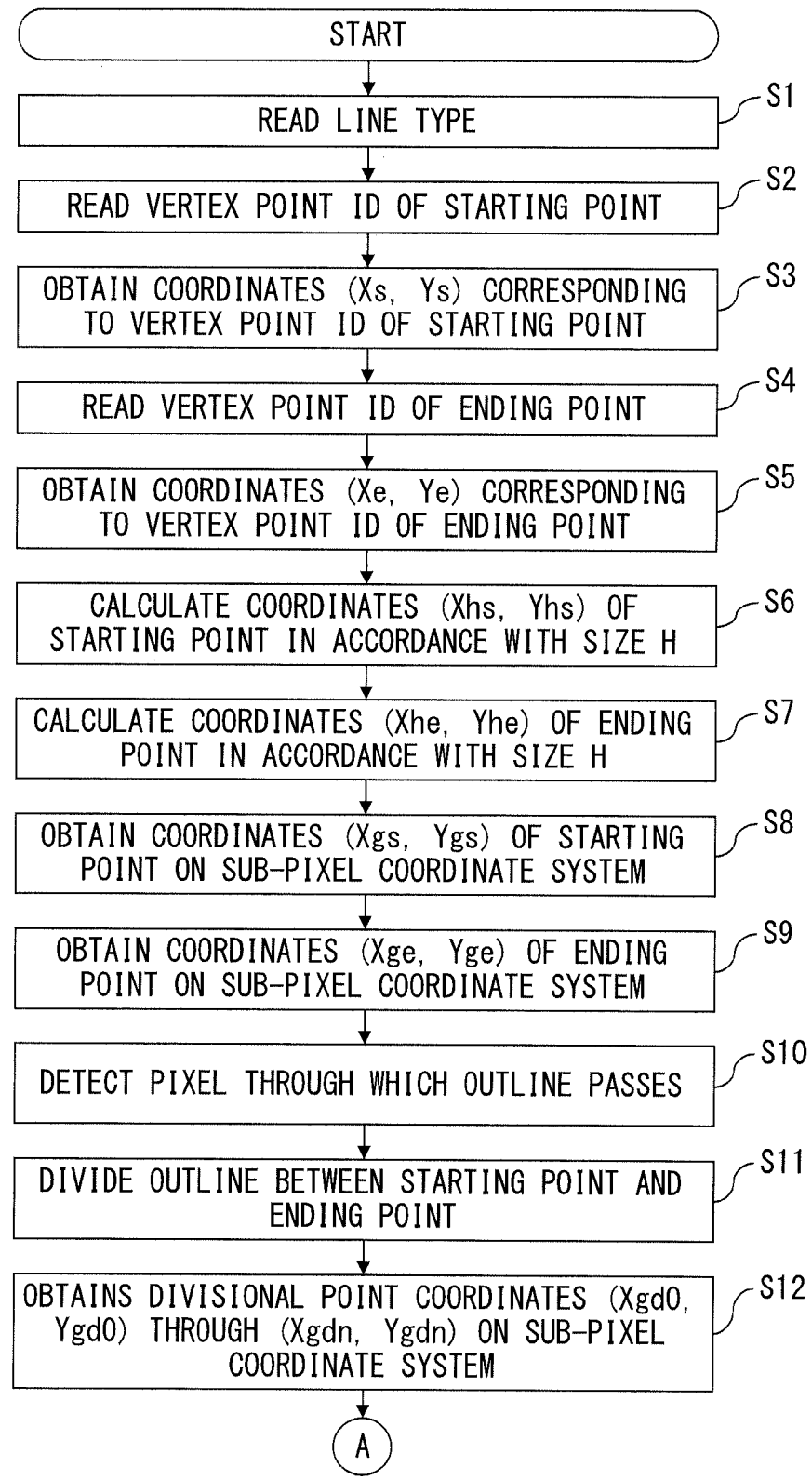
F I G. 5A

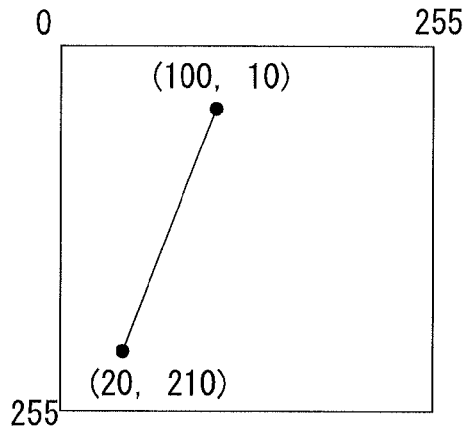
F I G. 6 A
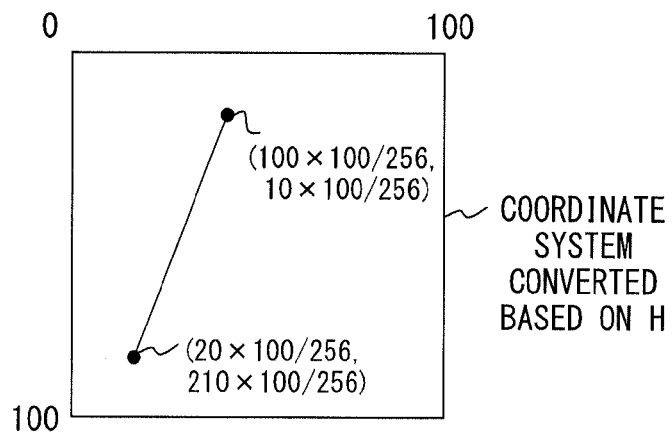
F I G. 6 B
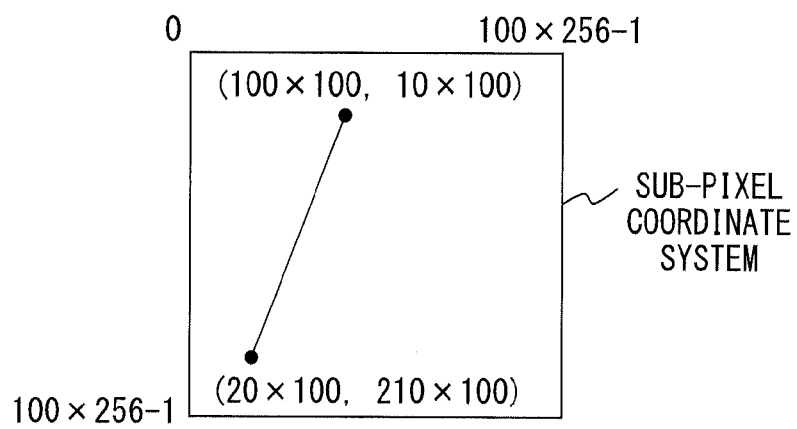
F I G. 6 C

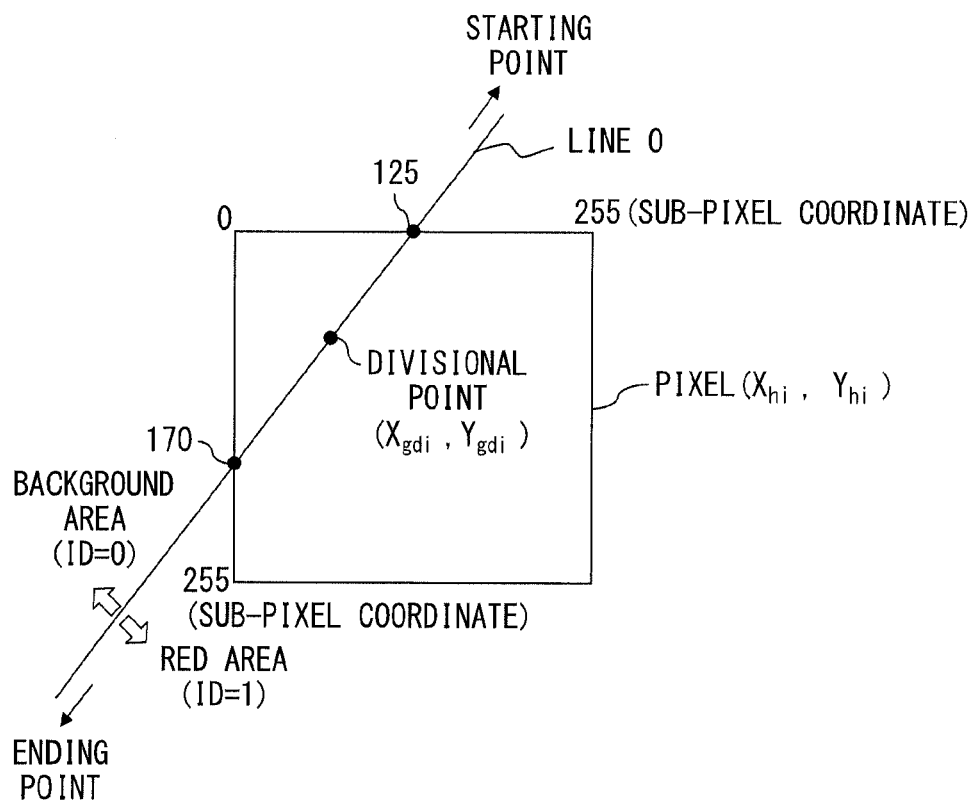
F I G. 7

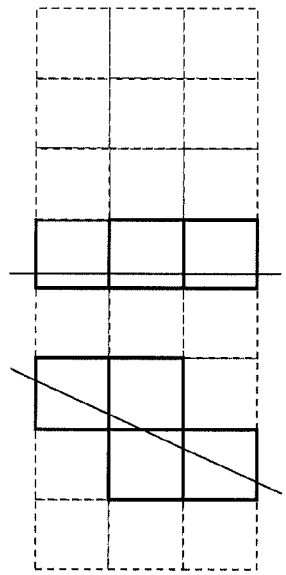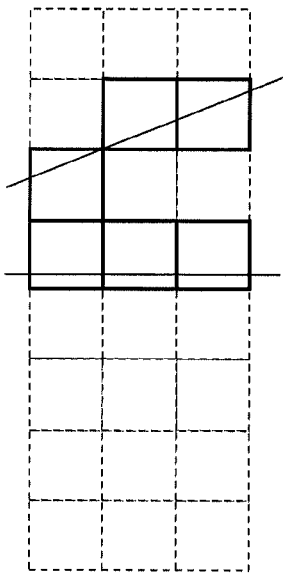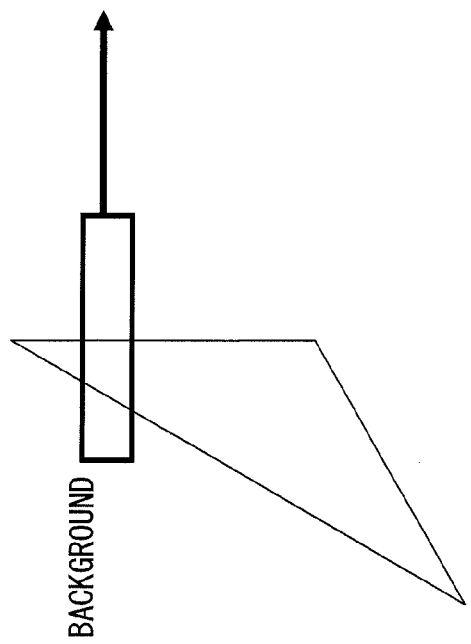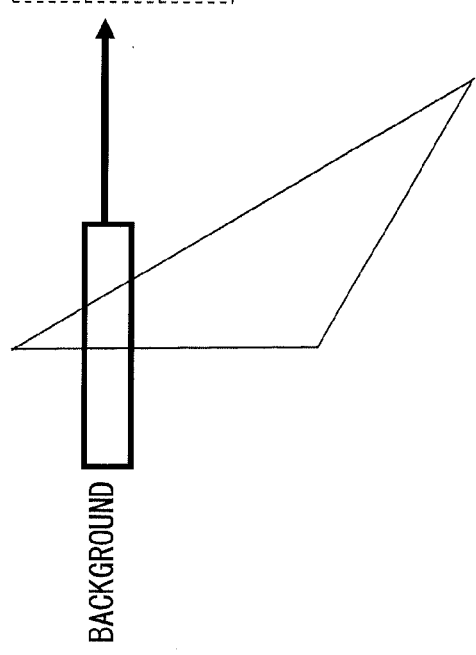
FIG. 11A     FIG. 11B

DEVICE AND METHOD FOR MULTICOLOR VECTOR IMAGE PROCESSING

CROSS-REFERENCE TO RELATED APPLICATION

This application is a continuation of an international application PCT/JP2009/000758, which was filed on Feb. 23, 2009.

FIELD

The present invention is related to a vector image processing device and a method for vector image processing.

BACKGROUND

As a method for drawing or expressing an image at a desired size, vector graphics is known. Vector graphics is one of the image formats used for computer graphics, and defines an image by utilizing outline information and plane information. Outline information defines the position of the starting point, the position of the ending point, and the attributes of lines. Plane information defines the attributes (colors and the like) of the plane enclosed by the outline. As has been described, according to vector graphics, since an image is defined in the form of numerical data, the data amount of an image is reduced compared with raster graphics. Also, vector graphics images do not deteriorate as easily in quality as compared to raster graphics images, when the size is changed.

When a vector image is to be drawn, a process of calculating coordinates through which the outline passes, a process of calculating an area to be filled in with color, and calculations of the color of the outline (anti-aliasing, for example) are executed. Accordingly, a vector image requires a greater amount of computation for generating image data than a raster image requires, and it takes long period of time to draw a vector image on a display device. Accordingly, techniques to reduce the period of time required to draw a vector image have been proposed.

In a method for processing figures according to a related art, to each pixel, control information indicating whether that pixel is a "left side edge point", a "right side edge point" or "not an edge point" of a colored area is added. Thereafter, the control information of each pixel is referred to in horizontal scanning, and pixels located between the left side edge point and the right side edge point are colored in with a specified color. Thereby, a filling process is executed at a higher speed (Japanese Patent No. 2681367, for example).

As another related art, a method related to a speeding up of a filling processes is proposed (Japanese Patent No. 3249096). Also, a technique of drawing an anti-aliased outline at high speed is described (Japanese Laid-open Patent Publication No. 2002-56395, for example). Further, related techniques are described also in Japanese Laid-open Patent Publication No. 2006-209654, Japanese Laid-open Patent Publication No. 5-35879, Japanese Laid-open Patent Publication No. 60-163164, and Japanese Laid-open Patent Publication No. 6-4679.

However, when a multicolor vector image is to be drawn according to conventional techniques, a plane is necessary for each color and a scan conversion process for each plane is also necessary. In other words, a great amount of processing is required to process a multicolor vector image. Accordingly, in an information processing device with poor resources such as a mobile phone terminal, drawing a multicolor vector image requires a long period of time.

SUMMARY

According to an aspect of an invention, a multicolor vector image processing device includes: a data analysis unit to analyze vector image data including line information defining an outline and area color information defining a first color and a second color respectively for two areas adjacent to each other across the outline; a detection unit to detect a boundary pixel through which an outline passes based on the line information; a longitudinally passing determination unit to determine whether or not the outline passes longitudinally through the boundary pixel; and a coloring unit to sequentially fill each pixel on a scan line. The coloring unit calculates a color of a target pixel based on the area color information and fills the target pixel with the calculated color when the target pixel is a boundary pixel through which an outline does not pass longitudinally. The coloring unit calculates a color of a target pixel based on the area color information, fills the target pixel with the calculated color, and changes a reference filling color from the first color to the second color defined for the target pixel when the target pixel is a boundary pixel through which an outline passes longitudinally. The coloring unit fills a target pixel with the reference filling color when the target pixel is not a boundary pixel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a configuration of a multicolor vector image processing device according to an embodiment;

FIG. 4 illustrates an example of vector image data that defines the image illustrated in FIG. 3;

FIG. 5A and FIG. 5B illustrate a flowchart of a process of generating pixel information;

FIG. 6A-6C explain a coordinate conversion performed when the size of an output figure is changed;

FIG. 7 explains calculations of area ratio;

FIG. 11A and FIG. 11B explain another method for multicolor vector image processing;

DESCRIPTION OF EMBODIMENTS

Figure 2:
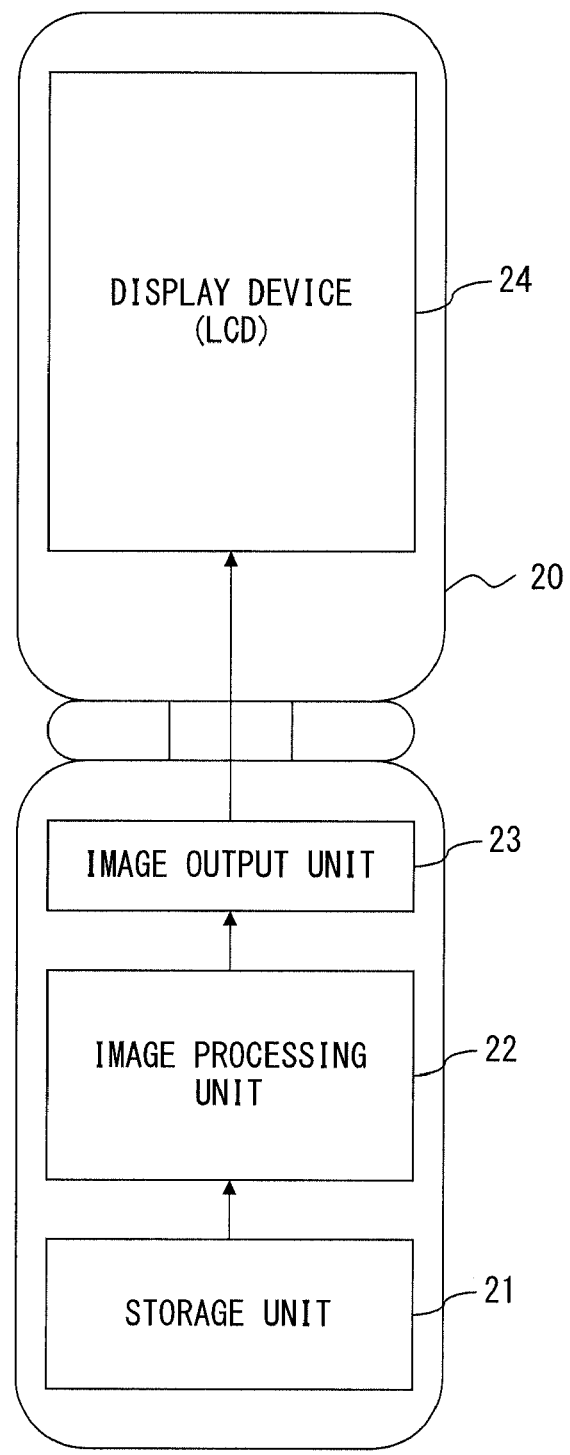
FIG. 2 illustrates an example of an information processing device having a multicolor vector image processing device.

FIG. 1 illustrates a configuration of a multicolor vector image processing device according to an embodiment. In FIG. 1, an image data storage memory 1 stores vector image data. The image data storage memory 1 is implemented, for example, by a semiconductor memory even though the scope of the invention is not limited to this example. A CPU 2 generates drawing data from the vector image data stored in the image data storage memory 1. A processing plane 3 is a working area used by the CPU 2, and is implemented, for example, by a semiconductor memory. An RGB drawing buffer 4 temporarily stores the drawing data generated by the CPU 2. An output device 5 outputs an image in accordance with the drawing data stored in the RGB drawing buffer 4. The output device 5 is, for example, a display device or a printer. Note that "vector image data" may also be referred to as vector graphics data or vector graphics image data.

The CPU 2 reads and executes an image processing program, and thereby provides an image data reading unit 11, a data analysis unit 12, a setting information reading unit 13, an image processing unit 14, and a coloring unit 19. The image data reading unit 11 reads the vector image data stored in the image data storage memory 1. The data analysis unit 12 extracts line information and area color information from the vector image data to analyze them. Line information includes coordinate information used for drawing an outline. Note that an outline may exist at boundary between areas with different colors. Alternatively, an outline may surround a figure element. Area color information includes information indicating the color of the area enclosed by an outline or the color of an area separated by an outline. The setting information reading unit 13 reads information designating the size and the position (coordinates) of an output image, and transfers the information to the image processing unit 14.

The image processing unit 14 includes an outline-passing-coordinate calculation unit 15, an area ratio calculation unit 16, a longitudinally passing determination unit 17, and an information adding unit 18, and generates pixel information so as to write the pixel information to the processing plane 3. The outline-passing-coordinate calculation unit 15 performs coordinate conversion for coordinate information used for drawing an outline based on the size and position of the image to be output, and calculates the outline of the image to be drawn. Thereafter, the outline-passing-coordinate calculation unit 15 detects a pixel through which the outline passes. Note that a pixel through which an outline passes is also referred to as a "boundary pixel". The area ratio calculation unit 16 calculates, for each boundary pixel, the area ratio between a plurality of areas obtained when a pixel area is divided by an outline. When, for example, one pixel is divided at the area ratio of 75:25 by an outline for separating an area into a red area and a yellow area, "Red: 75 percent, Yellow: 25 percent" is obtained as area ratio information. The longitudinally passing determination unit 17 determines whether or not each boundary pixel has an outline passing through the pixel longitudinally. That is, the longitudinally passing determination unit 17 determines, for each of the boundary pixels, whether or not the boundary pixel is passed longitudinally through by an outline.

The information adding unit 18 writes, to the processing plane 3, pixel information obtained by the outline-passing-coordinate calculation unit 15, the area ratio calculation unit 16, and the longitudinally passing determination unit 17. The processing plane 3 is capable of holding information indicating the states of each pixel. Thus, in this example, the information adding unit 18 adds, for each pixel, information indicating whether or not an outline passes through the pixel area (that is, whether the pixel is boundary pixel). Also, the information adding unit 18 adds, for each boundary pixel, a longitudinally passing flag that indicates whether or not an outline passes longitudinally through the pixel area. Further, the information adding unit 18 adds, for each boundary pixel, area ratio information obtained by the area ratio calculation unit 16.

The coloring unit 19 reads, from the processing plane 3, pixel information stored for each pixel, and performs scan conversion in order to determine the color of each pixel for each scan line. Thereby, drawing data is generated. The drawing data is written to the RGB drawing buffer 4.

Note that, as described above, the longitudinally passing determination unit 17 determines whether an outline passes longitudinally through a boundary pixel. The coloring unit 19 fills each pixel with a specified color on a scan line. Here, "longitudinally" may indicate a direction with respect to the scanning direction of drawings.

The multicolor vector image processing device according to the embodiment may include the image data storage memory 1, the processing plane 3, the RGB drawing buffer 4, and the output device 5. Also, the multicolor vector image processing device according to the embodiment may omit part or all of the image data storage memory 1, the processing plane 3, the RGB drawing buffer 4, and the output device 5.

FIG. 2 illustrates an example of an information processing device having a multicolor vector image processing device. In the example illustrated in FIG. 2, the multicolor vector image processing device is used in a mobile phone terminal device 20. The mobile phone terminal device 20 includes a storage unit 21, an image processing unit 22, an image output unit 23, and a display device 24. The storage unit 21 corresponds to the image data storage memory 1 illustrated in FIG. 1, and stores the vector image data. The image processing unit 22 corresponds to the CPU 22 and the processing plane 3 illustrated in FIG. 1, and generates drawing data from the vector image data stored in the storage unit 21. The image output unit 23 corresponds to the RGB drawing buffer 4 illustrated in FIG. 1, and outputs the drawing data to the display device 24. The display device 24 corresponds to the output device 5 illustrated in FIG. 1, and displays images in accordance with the drawing data. The multicolor vector image processing device according to the embodiment can be used in an arbitrary image processing device (personal computer or the like, for example).

Figure 3:
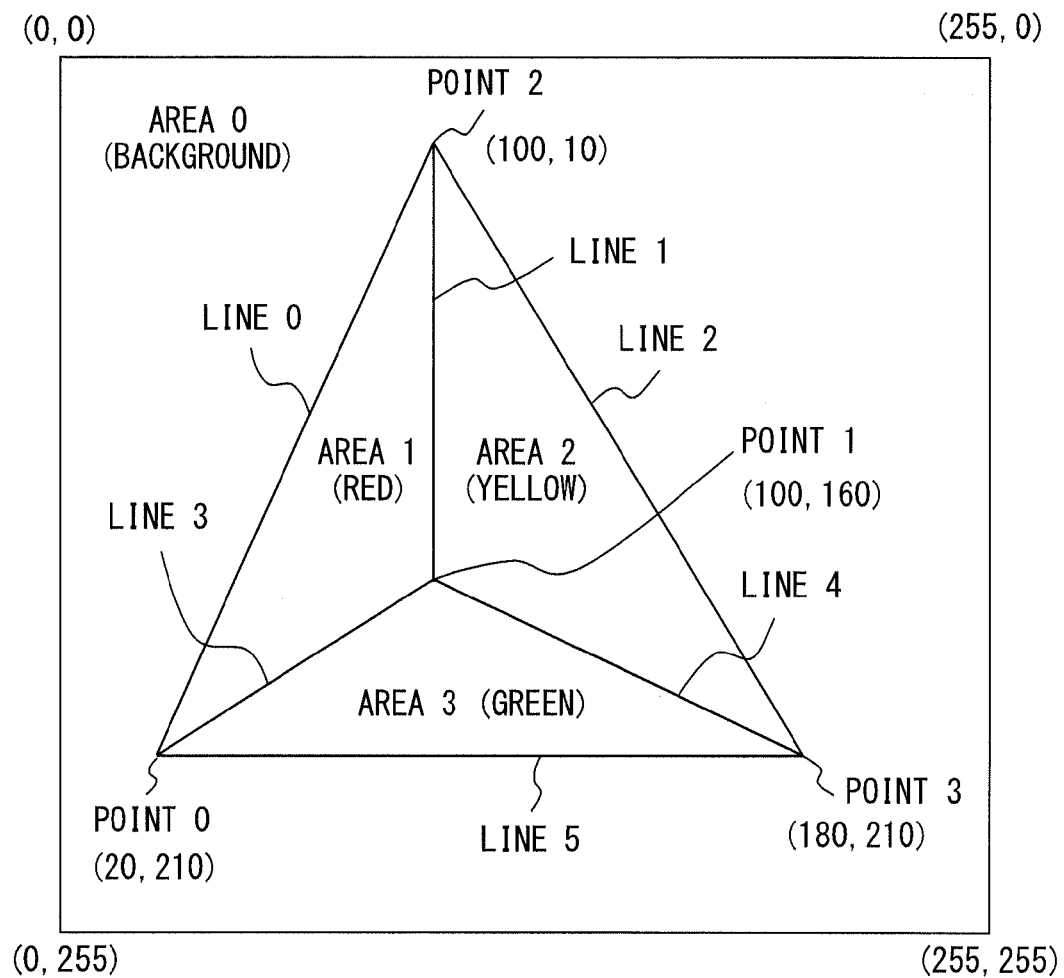
FIG. 3 illustrates an example of an image to be drawn.

FIG. 3 illustrates an example of an image to be drawn. In the example illustrated in FIG. 3, three triangles are drawn in the drawing area of the 256×256 pixels. The first triangle has three vertex points (the vertex point IDs=0, 1, and 2), and is filled in red. The second triangle has three vertex points (the vertex point IDs=1, 2, and 3), and is filled in yellow. The third triangle has three vertex points (the vertex point IDs=0, 1, and 3), and is filled in green.

FIG. 4 illustrates an example of vector image data that defines the image illustrated in FIG. 3. In this example, the vector image data contains vertex point coordinate information (POINT), area color information (AREA), and line information (LINE).

The vertex point coordinate information indicates the coordinates of respective vertex points. For example, the information indicates that the coordinates of vertex point 0, which is identified by "ID=0", are (20, 210). The information also indicates that the coordinates of vertex point 1, identified by "ID=1", are (100, 160).

The area color information indicates the color of each area enclosed by outlines. For example, the information indicates that the color of area 1, which is identified by "ID=1", is "R:G:B=255, 0, 0". The information also indicates that the color of area 2, identified by "ID=2", is "R:G:B=255, 255, 0". Information indicating "background" is given to area 0, which is not enclosed by an outline.

The line information indicates information related to each outline i.e., "line type", "starting point of line", "ending point of line", "area to the left of line", and "area to the right of line". For example, "STRAIGHT, 0, 2, 0, 1" is given to line 0, which is identified by "ID=0". This information indicates that "line 0 is straight (STRAIGHT), the starting point is vertex point 0, and the ending point is vertex point 2". "Area to the left of line=0" indicates that the area to the left of line 0 is "area 0 (background)" in the direction from the starting point (vertex point 0) toward the ending point (vertex point 2) of line 0. Similarly, "area to the right of line=1" indicates that the area to the right of line 0 is "area 1 (red)" in the direction from the starting point toward the ending point of line 0.

The above vector image data is stored in the image data storage memory 1 illustrated in FIG. 1. Note that methods for generating vector image data are not particularly limited.

Figure 5B:
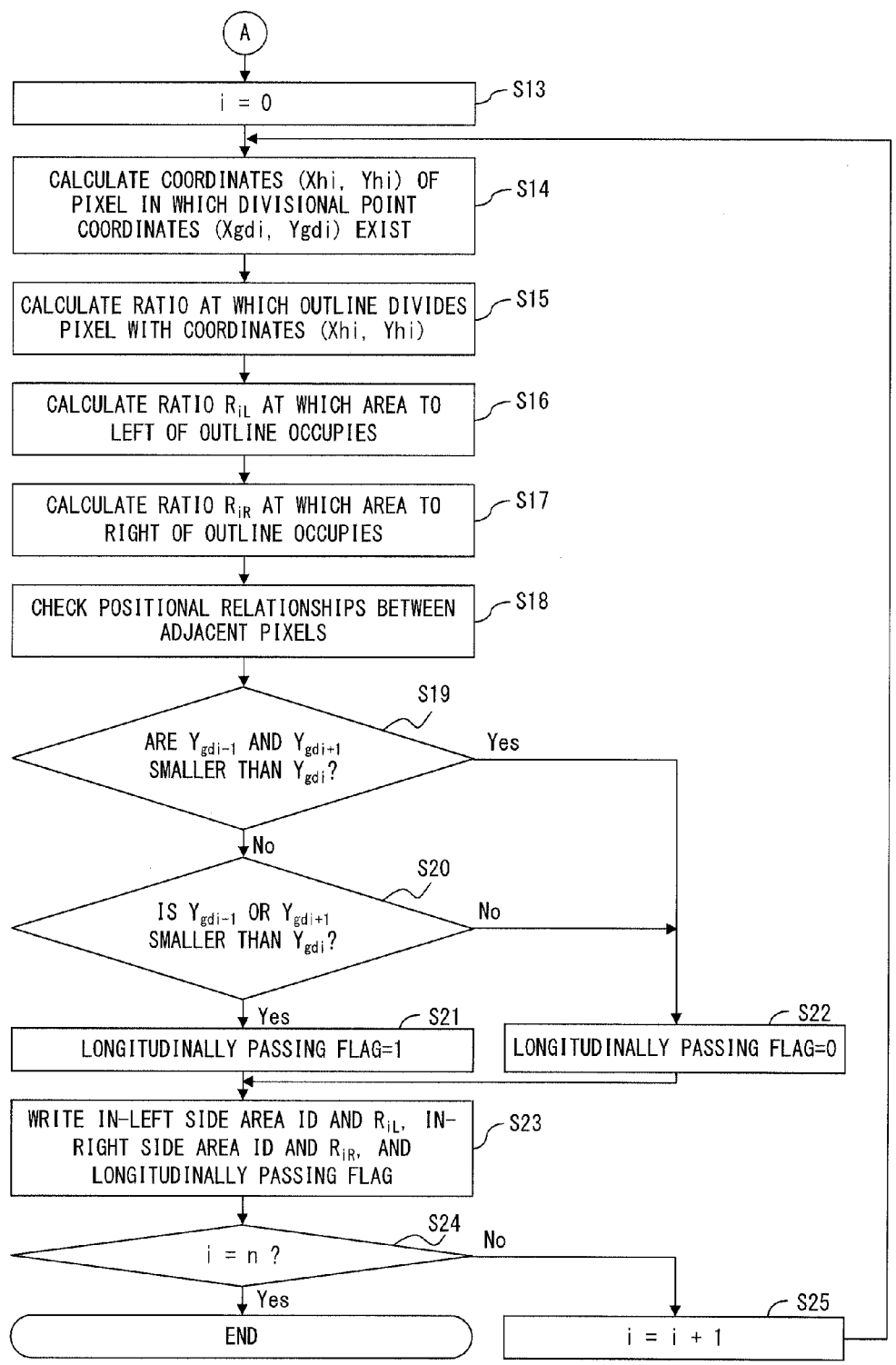

FIGS. 5A and 5B illustrate a flowchart explaining a process of generating pixel information from vector image data. The process of this flowchart is executed by the CPU 2 on each line defined by vector image data. In addition, a plurality of sets of vector image data are stored in the image data storage memory 1 in this example. Among those plurality of sets of vector image data, vector image data from which drawing data is to be generated is identified, and is read to the CPU 2. Hereinafter, explanations will be given by using line 0 illustrated in FIG. 3 as an example, as necessary.

Prior to the start of the process of this flowchart, the setting information reading unit 13 reads information that specifies the size, the position, and the like of an image to be output, and transfers the information to the image processing unit 14. In this example, it is assumed that "size=H" for an image to be output is read. "H" corresponds to an image of H×H pixels, and indicates that the original image defined by vector image data is enlarged or reduced to "H/256" times.

In step S1, the data analysis unit 12 detects the type of the line. In this example, the line type of line 0 is "straight". In steps S2 and S3, the data analysis unit 12 detects the vertex point ID and the coordinates of the starting point. In this example, "ID=0" and "$X_s=20$, $Y_s=210$" are obtained. Similarly, in steps S4 and S5, the data analysis unit 12 detects the vertex point ID and the coordinates of the ending point. In this example, "ID=2" and "$X_e=100$, $Y_e=10$" are obtained.

In steps S6 and S7, the outline-passing-coordinate calculation unit 15 converts the starting point coordinates and the ending point coordinates in accordance with size information H. The starting point coordinates and the ending point coordinates after the conversion (i.e., "$X_{hs}$, $Y_{hs}$" and "$X_{he}$, $Y_{he}$") are obtained by the equations below.

$$X_{hs}=(H/256) \times X_s$$

$$Y_{hs}=(H/256) \times Y_s$$

$$X_{he}=(H/256) \times X_e$$

$$Y_{he}=(H/256) \times Y_e$$

In steps S8 and S9, the outline-passing-coordinate calculation unit 15 calculates the starting point coordinates and the ending point coordinates on the sub-pixel coordinate system. The starting point coordinates and the ending point coordinates on the sub-pixel coordinate system (i.e., "$X_{gs}$, $Y_{gs}$" and "$X_{ge}$, $Y_{ge}$") are obtained by the equations below.

$$X_{gs}=H \times X_s$$

$$Y_{gs}=H \times Y_s$$

$$X_{ge}=H \times X_e$$

$$Y_{ge}=H \times Y_e$$

FIGS. 6A-6C explain computations executed in steps S6-S9. In this example, "H=100" is given. As illustrated in FIG. 6A, the coordinates of the starting and ending points of line 0 are (20, 210) and (100, 10), respectively. In such a case, as illustrated in FIG. 6B, the coordinates of the starting point and the ending points in the 100×100 pixel coordinate system are obtained by steps S6 and S7. Further, as illustrated in FIG. 6C, the coordinates of the starting point and the ending point in the sub-pixel coordinate system are obtained by steps S8 and S9. In addition, in the sub-pixel coordinate system, one pixel is expressed by 256×256 sub pixels.

Note that the scope of the invention is not limited to the 256×256 sub-pixel coordinate system in the example illustrated in FIGS. 6A-6C, and the sub-pixel coordinate system may be of, for example, 1024×1024, or of other numbers.

In step S10, the outline-passing-coordinate calculation unit 15 detects a pixel through which an outline passes (i.e., a boundary pixel). The boundary pixel is detected, for example, by utilizing the sub-pixel coordinate system.

In step S11, the image processing unit 14 divides the outline between its starting and ending points. This division is executed in such a manner that one pixel does not involve two or more divisional points. This process is implemented by a known geometric method such as, for example, recursively performing a process of dividing a line into halves. In this example, the outline is divided so that there is one divisional point in each pixel through which the outline passes. In the explanations below, it is assumed that n divisional points are obtained.

In step S12, the image processing unit 14 obtains coordinates ($X_{gd0}$, $Y_{gd0}$) through ($X_{dgn}$, $Y_{gdn}$) of respective divisional points in the sub-pixel coordinate system. In step S13, the image processing unit 14 initializes variable i, which identifies each of n divisional points, to zero.

In steps S14-S23, the area ratio of the pixel involving divisional point i is calculated, and a longitudinally passing flag is set. That is, in step S14, the image processing unit 14 calculates coordinates ($X_{hi}$, $Y_{hi}$) of the pixel in which divisional point coordinates ($X_{gdi}$, $Y_{gdi}$) exist. The coordinates of this pixel are obtained by the equations below.

$$X_{hi}=X_{gdi}/256$$

$$Y_{hi}=Y_{gdi}/256$$

In steps S15-S17, the area ratio calculation unit 16 calculates the ratio of areas obtained when the pixel ($X_{hi}$, $Y_{hi}$) is divided by the outline. For example, when one pixel area is divided into two areas by an outline, the area ratio "$R_{iL}:R_{iR}$" of those two areas are calculated. $R_{iL}$ indicates a share of an area of left hand side portion with respect to one pixel area, and $R_{iR}$ indicates a share of an area of right hand side portion with respect to one pixel area.

FIG. 7 explains calculations of area ratio. In this example, one pixel is expressed using 256×256 sub pixels. Also, an outline crosses the top side and the left side of the pixel. In this example, each pixel is a square, although the scope of the invention is not limited to this example. In this case, the area of one pixel is defined as below by utilizing the sub-pixel coordinate system.

Area of pixel area=256×256=65536

The area to the left of the outline is obtained by the equation below.

The area to the left of the outline=(125×170)/2=10625

Also, the area to the right of the outline is obtained by the equation below.

The area to the right of the outline=65536−10625=54911

Accordingly, the area ratio "16%:84%" is obtained when the area of one pixel is defined as 100%.

In steps S18-S22, the longitudinally passing determination unit 17 determines, for each boundary pixel, whether or not an outline passes through the boundary pixel longitudinally. Specifically, the longitudinally passing determination unit 17 checks the positional relationships between adjacent pixels for each boundary pixel. For example, Y-coordinate $Y_{gdi}$ of pixel i and Y-coordinate $Y_{gdi-1}$ of pixel i−1 are compared. In addition, Y-coordinate $Y_{gdi}$ of pixel i and Y-coordinate $Y_{gdi+1}$ of pixel i+1 are also compared. Note that "pixel i", "pixel i−1", and "pixel i+1" indicate pixels in which divisional point i, divisional point i−1, and divisional point i+1 are located, respectively. Pixel i−1, pixel i and pixel i+1 sequentially exists on an outline when the outline is searched from the start point to the end point of the outline.

When "$Y_{gdi-1}<Y_{gdi}$" and "$Y_{gdi+1}<Y_{gdi}$" are satisfied in step S19, it is determined that the outline does not pass longitudinally through pixel i. When the condition in step S19 is not satisfied, step S20 is executed. When "$Y_{gdi-1}<Y_{gdi}$" or "$Y_{gdi+1}<Y_{gdi}$" is satisfied in step S20, it is determined that the outline passes longitudinally through pixel i. When the condition in S20 is not satisfied, it is determined that the outline does not pass longitudinally through pixel i. When it is determined that the outline passes longitudinally through pixel i (that is, "NO" in step S19 and "YES" in step S20), "longitudinally passing flag=1" is given to the pixel i in step S21. When it is determined that the outline does not pass longitudinally through pixel i (that is, "YES" in step S19 or "NO" in step S20), "longitudinally passing flag=0" is given to the pixel i in step S22. Note that, it may be checked whether "$Y_{gdi-1}>Y_{gdi}$" and "$Y_{gdi+1}>Y_{gdi}$" are satisfied in step S19, and it may be checked whether "$Y_{gdi-1}>Y_{gdi}$" or "$Y_{gdi+1}>Y_{gdi}$" is satisfied in step S20.

In step S23, for each pixel, the information adding unit 18 writes, to the processing plane 3, pixel information obtained by the outline-passing-coordinate calculation unit 15, the area ratio calculation unit 16, and the longitudinally passing determination unit 17. In this example, the information adding unit 18 writes "longitudinally passing flag", "area ratio and color of left side area", and "area ratio and color of right side area" to the storage area for pixel $(X_{hi}, Y_{hi})$ in the processing plane 3. The area ratios have been calculated in steps S16 and S17. Since the colors of the left side area and the right side area have been given as vector image data, those colors are determined by identifying the outline that passes through the target pixel (that is, pixel i).

In step S24, the image processing unit 14 checks whether or not the processes of steps S14-S23 have been finished for all divisional points. That is, it is checked whether or not variable i has reached n. When "i<n" is satisfied, the image processing unit 14 increments variable i in step S25, and the process returns to step S14. Thereby, the processes of steps S14-S23 are executed for all divisional points.

The processes in the flowchart illustrated in FIGS. 5A and 5B are executed on each outline. In the example illustrated in FIG. 3, the processes are executed on outlines 0-5, respectively.

Figure 8:
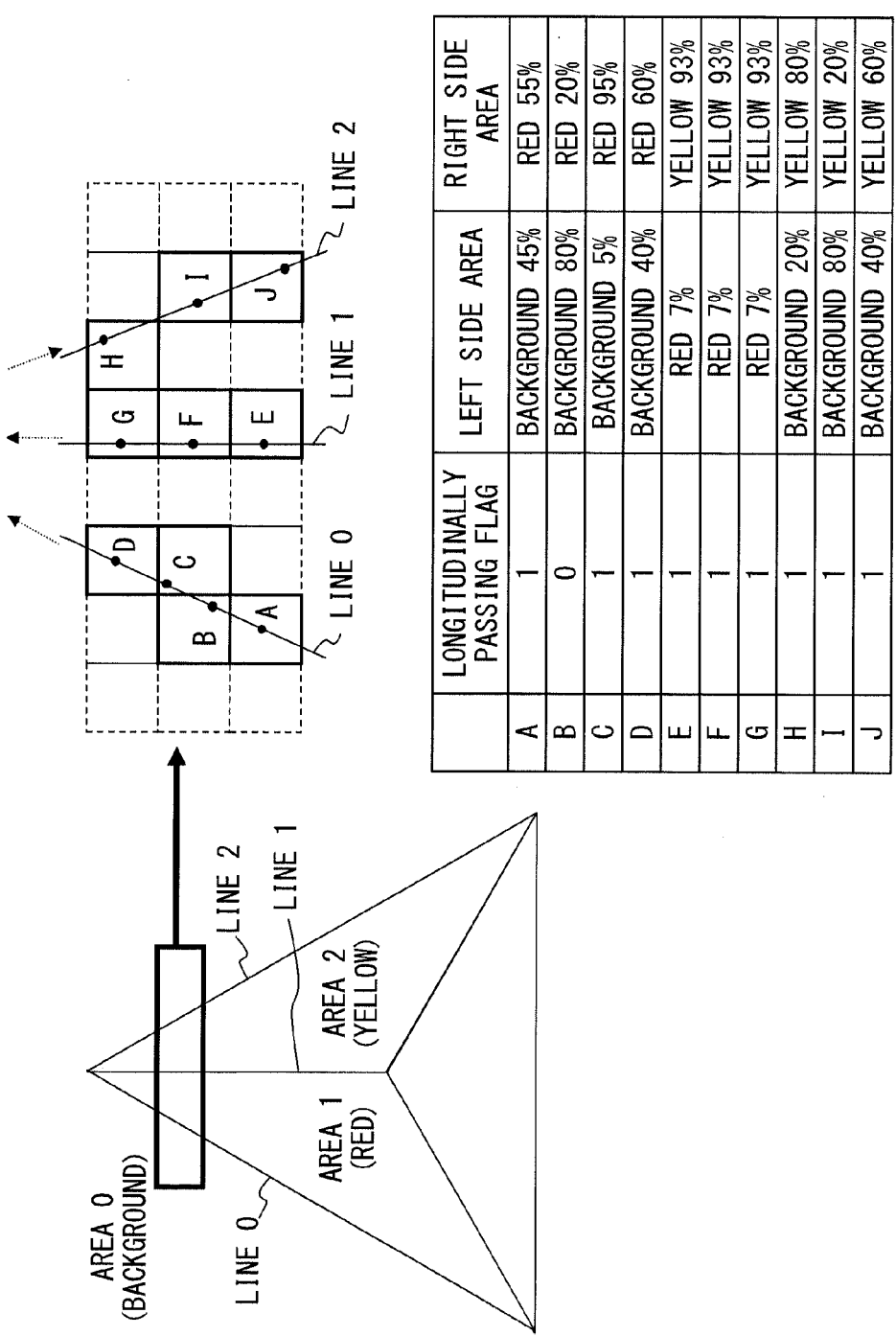
FIG. 8 illustrates an example of information obtained by an image processing unit.

FIG. 8 illustrates an example of information obtained by the image processing unit 14. In this example, only four pixels A-D through which outline 0 passes, three pixels E-G through which outline 1 passes, and three pixels H-J through which outline 2 passes are illustrated. In addition, pixels A-J involve divisional points A-J, respectively.

Longitudinally passing flags are determined in accordance with positional relationships between adjacent pixels as described above. For example, the longitudinally passing flag of pixel B is determined based on the Y coordinates of pixels A, B, and C. Here, if it is assumed that pixel B is identified by "i" in the flowchart of FIGS. 5A and 5B, pixel A and pixel C are identified by "i−1" and "i+1", respectively. In this example, pixel A is located below pixel B. In other words, the Y coordinate of pixel A is greater than the Y coordinate of pixel B. Also, pixel C is located to the right of pixel B. In other words, the Y coordinate of pixel C is equal to the Y coordinate of pixel B. Accordingly, in the flowchart illustrated in FIG. 5B, the results of steps S19 and S20 are determined to be "NO" for pixel B, and "longitudinally passing flag=0" is given to pixel B.

Similarly, the longitudinally passing flag of pixel C is determined based on the Y coordinates of pixels B, C, and D. Here, if it is assumed that pixel C is identified by "i" in the flowchart of FIGS. 5A and 5B, pixel B and pixel D are identified by "i−1" and "i+1", respectively. In this example, pixel B is located to the left of pixel C. In other words, the Y coordinate of pixel B is equal to the Y coordinate of pixel C. Also, pixel D is located above pixel C. In other words, the Y coordinate of pixel D is smaller than the Y coordinate of pixel C. Accordingly, in the flowchart illustrated in FIG. 5B, the results of steps S19 and S20 are determined to be "NO", and "Yes", respectively, and "longitudinally passing flag=1" is given to pixel C.

Also, area color information is given to each pixel through which an outline passes. For example, pixel A is divided by outline 0 into two areas, and has been given "left side area: 45%, background" and "right side area: 55%, red".

In the above example, the longitudinally passing flag for each boundary pixel is determined by utilizing divisional points dividing an outline between starting point and ending point. However, longitudinally passing flags may be determined using other methods. For example, in the example illustrated in FIG. 8, line 0 passes through only one pixel (pixel D) on the first scan line. In such a case, it is determined that line 0 passes longitudinally through pixel D. On the second scan line, line 0 passes through two consecutive pixels (pixels B and C). In such a case, it is determined that line 0 passes longitudinally through one of pixels B and C. In this case, there is no particular limitation on determining which of pixels B and C is to be determined to "be passes longitudinally through by an outline". However, for example, it may be determined based on the X coordinate of each pixel (B, C) or it may be determined by utilizing the area ratio of the color area of each pixel (B, C). Also, when line 0 passes through three or more consecutive pixels on a scan line, it may be determined that an line 0 passes longitudinally through one of those pixels.

Figure 9:
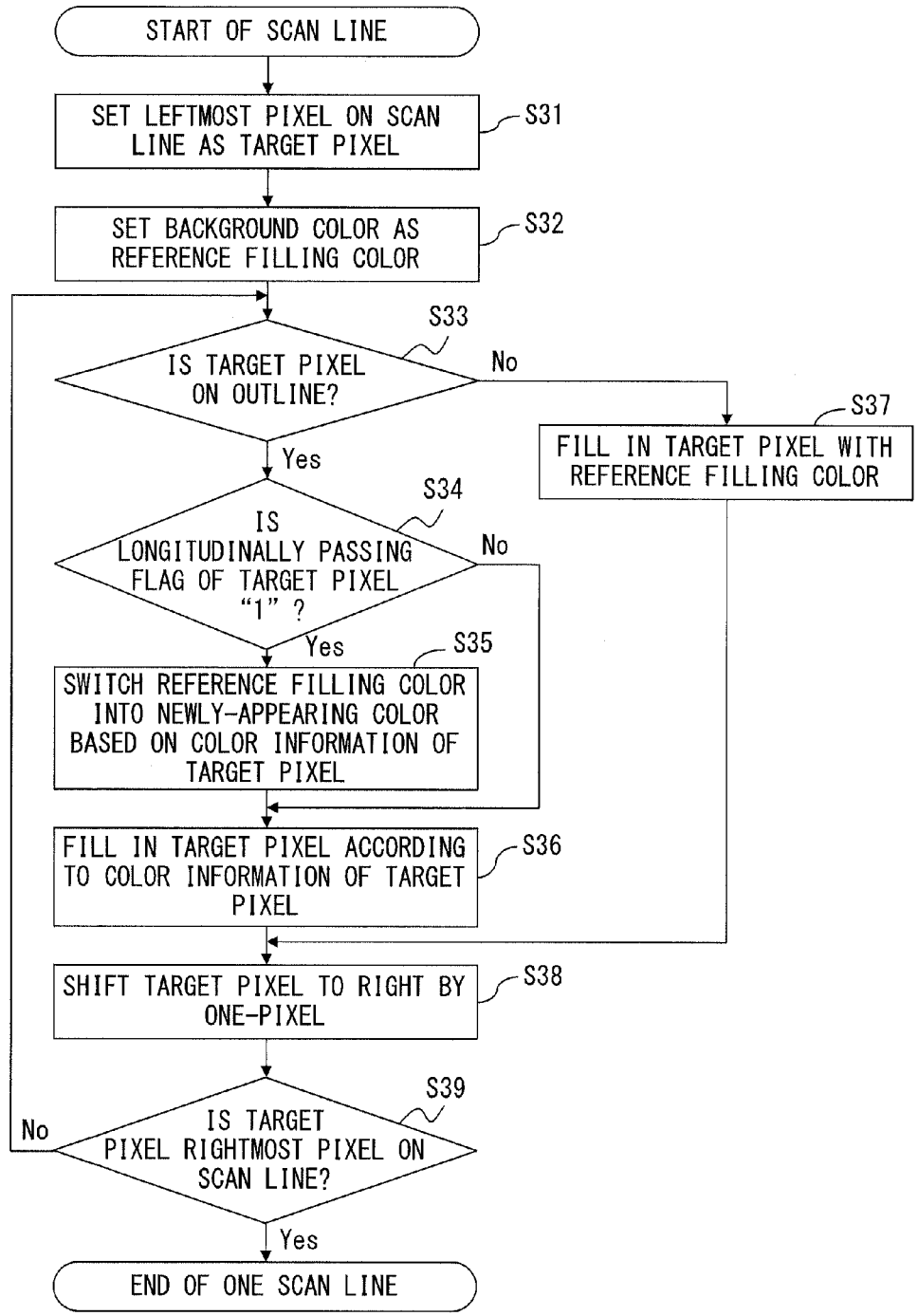
FIG. 9 illustrates a flowchart explaining a filling process according to an embodiment.

FIG. 9 illustrates a flowchart explaining a filling process according to an embodiment. This process is executed for each scan line by the coloring unit 19 in accordance with information stored in the processing plane 3. The coloring unit 19 manages "reference filling color" by utilizing a register or a memory area.

In step S31, the coloring unit 19 sets the leftmost pixel on the scan line as a target pixel. In step S32, the coloring unit 19 sets the background color as the reference filling color. Note that the background color is, for example, prescribed and registered in advance.

In step S33, the coloring unit 19 checks whether or not an outline passes through the target pixel. When an outline passes through the target pixel, the coloring unit 19 checks the longitudinally passing flag of that target pixel in step S34. When the longitudinally passing flag is "1", step S35 is executed. When the longitudinally passing flag is "0", step S35 is skipped.

In step S35, the coloring unit 19 refers to the area color information of the target pixel, and switches the reference filling colors. For example, pixel A illustrated in FIG. 8 is assumed to be a target pixel. In such a case, the current reference filling color is "background color". Also, "left side area: background" and "right side area: red" have been given to pixel A. Accordingly, the reference filling color is switched from "background color" to "red".

In step S36, the coloring unit 19 refers to the area color information of the target pixel, and determines the color of that target pixel. For example, it is assumed that "left side area: 40%, red" and "right side area: 60%, green" have been given to the target pixel, and that "red" is expressed by "255, 0, 0" and "green" is expressed by "0, 255, 0" in the RGB expression. In such a case, the color of the target pixel is expressed by "255×0.40, 255×0.60, 0". In other words, the target pixel is colored in with "102, 153, 0".

When an outline does not pass through the target pixel (No in step S33), step S37 is executed. In step S37, the coloring unit 19 fills in the target pixel with the reference filling color. The reference filling color is initially set in step S32 and may be changed in step S35.

In step S38, the coloring unit 19 shifts the target pixel to the right by one pixel. In step S39, the coloring unit 19 checks whether or not a new target pixel is the rightmost pixel on the scan line. When the new target pixel is not the rightmost pixel, the coloring unit 19 executes the processes of steps S33-37 on that new target pixel.

As described above, the coloring unit 19 sequentially determines the colors of respective pixels for each scan line in accordance with pixel information stored in the processing plane 3. When the above process has been performed for all scan lines, drawing data for one frame is generated.

The RGB information generated by the coloring unit 19 for each pixel is written to the RGB drawing buffer 4. The RGB drawing buffer 4 draws an image on the output device 5 in accordance with given RGB information.

Figure 10:
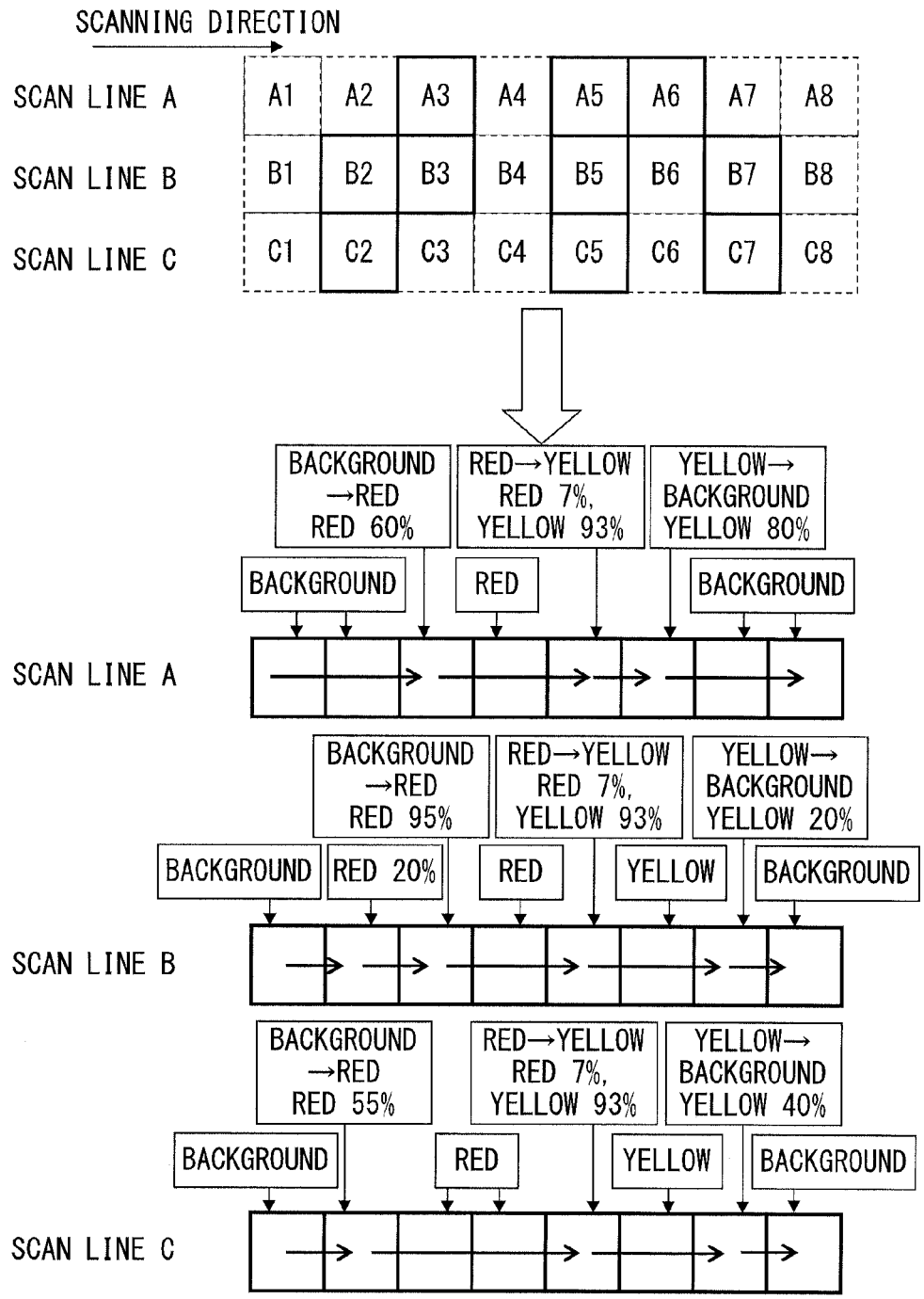
FIG. 10 illustrates an example of a filling process.

FIG. 10 illustrates an example of a filling process. In this example, it is assumed that pixels A1-A8, B1-88, and C1-C8 are filled in with colors on three scan lines A-C. Note that these pixels correspond to those in the example illustrated in FIG. 8. That is, outline 0 passes through pixels C2, B2, B3, and A3, outline 1 passes through C5, B5, and A5, and outline 2 passes through A6, B7, and C7. Also, the longitudinally passing flags of pixels A3, A5, A6, B3, B5, B7, C2, C5, and C7 are "1", and the longitudinally passing flag of pixel B2 is "0".

On scan line A, pixels A1 and A2 are colored in with the reference filling color (background color). In the flowchart of FIG. 9, background color has been set in step S32. Since an outline does not pass through pixels A1, A2, "NO" is obtained in step S33. Thus, A1 and A2 are colored in with the background color in step 37.

"Longitudinally passing flag=1", "left side area: 40%, background" and "right side area: 60%, red" have been given to pixel A3. In this case, pixel A3 is colored in with "red 60%". It is now assumed that the background color and red color are expressed by "0, 0, 0" and "255, 0, 0", respectively, in the RGB expression. Then, pixel A3 is colored in with "153, 0, 0". Also, since the longitudinally passing flag of pixel A3 is "1", the reference filling color is switched from "background" to "red".

In the flowchart of FIG. 9, since the line 0 passes longitudinally through pixel A3, steps S33 and S34 are determined to be "YES". In step S35, the reference filling color is switched from "background" to "red". Then in step S36, pixel A3 is colored in with "153, 0, 0" in RGB expression.

Pixel A4 does not have outlines passing through it. That is, no outline passes through pixel A4. In such a case, this pixel is colored in with the reference filling color. The reference filling color has been switched from "background" to "red" at pixel A3. Accordingly, pixel A4 is colored in with "red". In the flowchart of FIG. 9, since no outline passes through pixel A4, step S33 is determined to be "NO" and step S37 is executed. Then pixel A4 is colored in with "red" in step S37.

With respect to pixel A5, "longitudinally passing flag=1", "left side area: 7%, red", and "right side area: 93%, yellow" have been detected. In such a case, pixel A5 is colored in with "mixed color containing 7% red and 93% yellow". Also, the reference filling color is switched from "red" to "yellow" at pixel A5. Similarly, with respect to A6, "longitudinally passing flag=1", "left side area: 80%, yellow", and "right side area: 20%, background" have been detected. In such a case, pixel A6 is colored in with "yellow 80%". Also, at pixel A5, the reference filling color is switched from "yellow" to "background".

Pixels A7 and A8 do not have outlines passing through them. That is, no outline passes through pixel A7 and A8. In such a case, these pixels are colored in with the reference filling color. The reference filling color has been switched from "red" to "yellow" at pixel A5, and has further been switched from "yellow" to "background" at pixel A6. Accordingly, pixels A7 and A8 are colored in with "background".

As described above, with respect to a pixel through which an outline passes, the color of the pixel is determined in accordance with the area ratio between two color areas that are adjacent to each other within the pixel. Also, the reference filling color is switched at a pixel having a "longitudinally passing flag=1" among pixels through which an outline passes. On the other hand, a pixel through which no outline passes is colored in with the reference filling color.

The filling process for scan lines B and C are similar to those for scan line A. However, on scan line B, "longitudinally passing flag=0" has been given to pixel B2. Accordingly, pixels B1-B4 are processed as described below.

Pixel B1 is colored in with the background color. With respect to pixel B2, "longitudinally passing flag=0", "left side area: 80%, background", and "right side area: 20%, red" have been detected. In such a case, pixel B2 is colored in with "red 20%". However, since the longitudinally passing flag of pixel B2 is "0", the reference filling color is not changed from "background".

With respect to B3, "longitudinally passing flag=1", "left side area: 5%, background", and "right side area: 95%, red" have been detected. In such a case, pixel A3 is colored in with "red 95%". In addition, since the longitudinally passing flag of pixel B3 is "1", the reference filling color is switched from "background" to "red". Pixel B4 does not have outlines passing through it. That is, no outline passes through pixel B4. In such a case, pixel B4 is colored in with the reference filling color. In other words, pixel B4 is colored in with "red".

FIGS. 11A and 11B explain another method for multicolor vector image processing. In this explanation, the same image as illustrated in FIG. 8 or FIG. 10 is drawn.

In the methods illustrated in FIGS. 11A and 11B, when there are a plurality of color areas segmented by outlines, a different plane is used for each color area to be drawn. In other words, the plane illustrated in FIG. 11A is generated in order to draw a red area. The plane illustrated in FIG. 11B is generated in order to draw a yellow area. When the entire image is to be displayed on the display device, color information of pixels that correspond to each other between the planes are synthesized.

By contrast, in a method for image processing according to the embodiments, when there are a plurality of image areas segmented by outlines, the plurality of color areas are drawn using a single plane, i.e., it is not necessary to draw each color area using a different plane. Thus, according to a method for image processing according to the embodiments, processing amount for drawing a multicolor vector image is reduced compared with the method illustrated in FIGS. 11A and 11B. Accordingly, even if the processing ability of an information processing device is low, it does not take long time to draw a multicolor vector image by implementing the method of the embodiments.

Further, in a method for image processing according to the embodiments, it is possible to perform a process of switching filling colors and to perform anti-aliasing within a step of scanning each horizontal line. This reduces the amount of computation for drawing a multicolor vector image.

Further, in a method for image processing according to the embodiments, the above effects are also attained when vector images are converted in order to obtain an output image in a desired size.

In the above embodiments, explanations have been given based on an assumption that when an outline is passing through a pixel, and that pixel is divided into two color areas. However, a method for image processing according to the embodiments may be applied even when one pixel is divided into three or more color areas. Hereinafter, image processing performed when one pixel is divided by outlines into three color areas will be explained by referring to FIG. 12.

Figure 12:
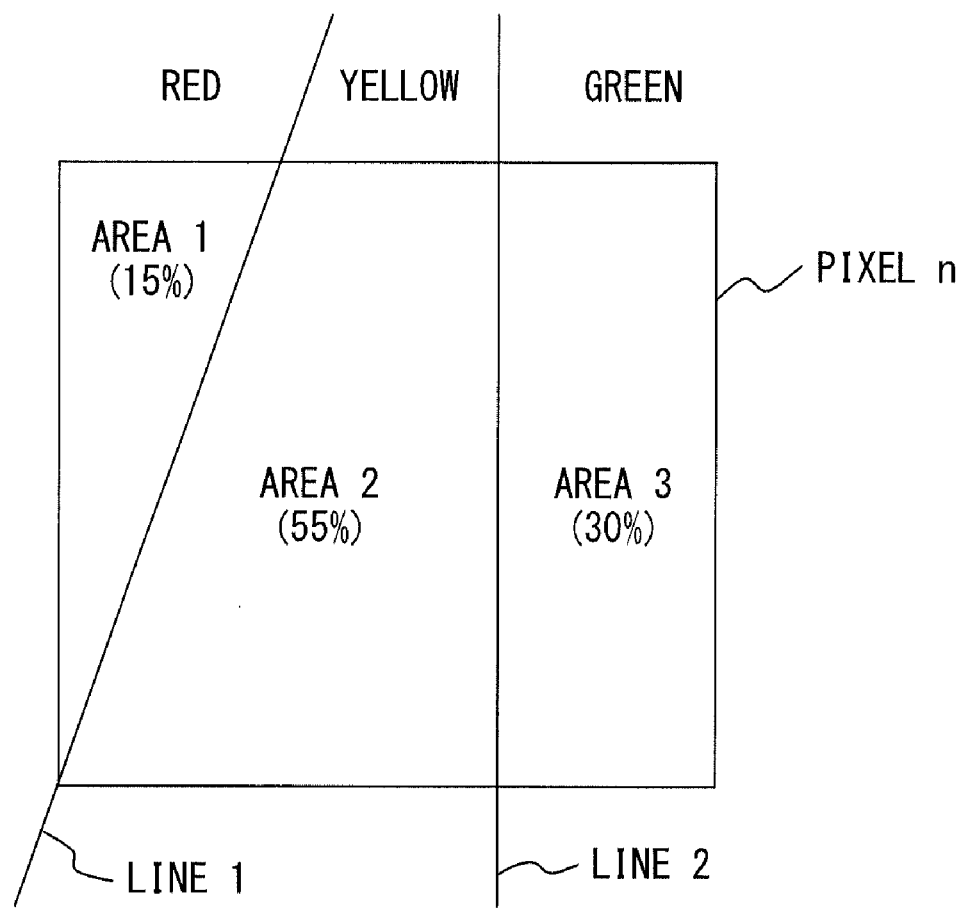
FIG. 12 illustrates an example in a case in which a pixel is divided into three color areas by outlines.

In the example illustrated in FIG. 12, outlines 1 and 2 pass through pixel n. Pixel n is divided into three color areas by these outlines. The area ratio between color areas 1 through 3 is "15%, 55%, 30%". The area to the left of outline 1 is "red (255, 0, 0)", the area to the right of outline 1 (that is, the area to the left of outline 2) is "yellow (255, 255, 0)", and the area to the right of outline 2 is "green (0, 255, 0)".

In such a case, the color of pixel n is determined as below.
R=255×0.15+255×0.55+0×0.30=178
G=0×0.15+255×0.55+255×0.30=217
B=0×0.15+0×0.55+0×0.30=0

The longitudinally passing flags of pixel n are set for outlines 1 and 2, respectively. When, for example, the longitudinally passing flag of outline 1 is "0" and the longitudinally passing flag of outline 2 is "1", the reference filling color is switched from "red" to "green". When the longitudinally passing flag of outline 1 is "1", and the longitudinally passing flag of outline 2 is "0", the reference filling color is switched from "red" to "yellow". Further, when the longitudinally passing flags of outlines 1 and 2 are both "1", the reference filling color is switched from "red" to "green". Additionally, when the longitudinally passing flags of outlines 1 and 2 are both "0", the reference filling color remains "red".

Figure 13:
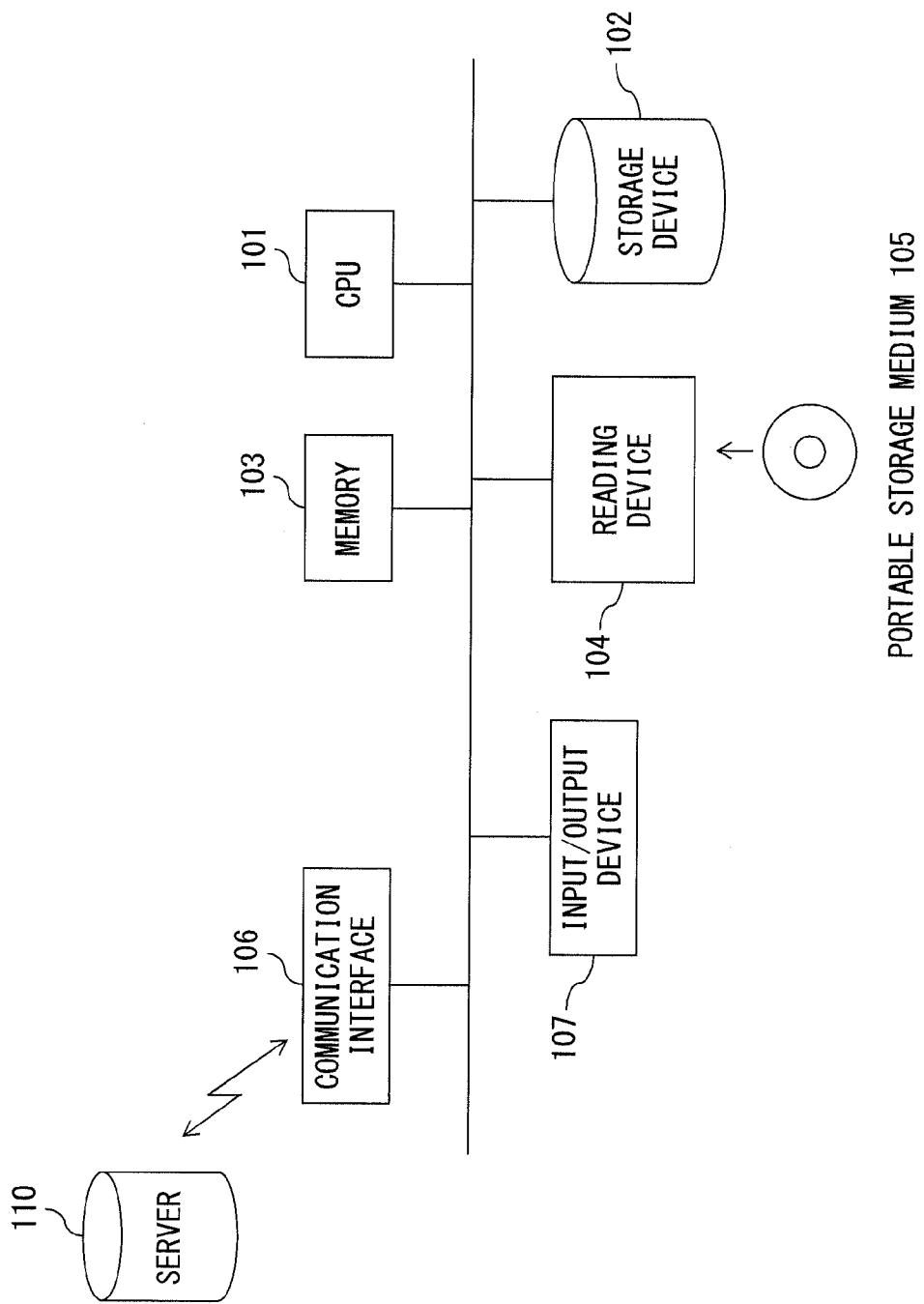
FIG. 13 illustrates a hardware configuration of a multicolor vector image processing device according to embodiments.

FIG. 13 illustrates a hardware configuration of a multicolor vector image processing device according to the embodiments. In FIG. 13, a CPU 101, which corresponds to the CPU 2 illustrated in FIG. 1, executes an image processing program according to the embodiments using a memory 103. The image processing program describes the process of the flowchart illustrated in FIGS. 5A, 5B, and 9. Also, the image data reading unit 11, the data analysis unit 12, the setting information reading unit 13, the image processing unit 14 (the outline-passing-coordinate calculation unit 15, the area ratio calculation unit 16, the longitudinally passing determination unit 17, and the information adding unit 18), and the coloring unit 19 are implemented by executing the image processing program.

A storage device 102 is, for example, a semiconductor memory or a hard disk. The storage device 102 stores an image processing program. Note that the storage device 102 may be an external storage device. The memory 103 is, for example, a semiconductor memory, and includes a RAM area and a ROM area.

A reading device 104 accesses a portable storage medium 105 in accordance with instructions from the CPU 101. The portable storage medium 105 is realized by, for example, a semiconductor device (a PC card or the like), a medium utilizing electromagnetic effects so as to input and output information, and a medium utilizing optical effects so as to input and output information. A communication interface 106 transmits and receives data through a network in accordance with instructions from the CPU 101. An input/output device 107 corresponds, for example, to a display device.

An image processing program according to the embodiments is provided, for example, in the forms described below.
(1) The image processing program has already been installed in the storage device 102.
(2) The image processing program is provided by the portable storage medium 105.
(3) The image processing program is downloaded from a program server 110.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions has (have) been described in detail, it should be understood that the various changes, substitutions, and alterations could be made hereto without departing from the spirit and scope of the invention.

What is claimed is:
1. A multicolor vector image processing device, comprising
a data analysis unit to analyze vector image data including line information defining an outline and area color information defining a first color and a second color respectively for two areas adjacent to each other across the outline;
a detection unit to detect a boundary pixel through which an outline passes based on the line information;
a longitudinally passing determination unit to determine whether or not the outline passes longitudinally through the boundary pixel; and
a coloring unit to sequentially fill each pixel on a scan line, wherein
the coloring unit calculates a color of a target pixel based on the area color information and fills the target pixel with the calculated color when the target pixel is a boundary pixel through which an outline does not pass longitudinally,
the coloring unit calculates a color of a target pixel based on the area color information, fills the target pixel with the calculated color, and changes a reference filling color from the first color to the second color defined for the target pixel when the target pixel is a boundary pixel through which an outline passes longitudinally, the coloring unit fills a target pixel with the reference filling color when the target pixel is not a boundary pixel.

2. The multicolor vector image processing device according to claim 1, further comprising a storing unit to store information indicating whether or not a pixel is a boundary pixel for each pixel, and to store information indicating whether or not an outline passes longitudinally through a pixel, information used for identifying a plurality of color areas belonging to a pixel area, and information indicating area ratios between the plurality of color areas for each boundary pixel, wherein the coloring unit fills each pixel on a scan line with a color in accordance with the information stored in the storing unit.

3. The multicolor vector image processing device according to claim 1, wherein the longitudinally passing determination unit determines that an outline passes longitudinally through a second boundary pixel when "Y1<Y2" or "Y3<Y2" is satisfied, where coordinates in a vertical direction of a first boundary pixel, the second boundary pixel, and a third boundary pixel sequentially existing on the outline are Y1, Y2, and Y3, respectively.

4. The multicolor vector image processing device according to claim 1, wherein the longitudinally passing determination unit determines that an outline passes longitudinally through a first pixel when the outline passes through only the first pixel on a first scan line, and the longitudinally passing determination unit determines that an outline passes longitudinally through a second pixel and that the outline does not pass longitudinally through a third pixel when the outline passes through the second and third pixels that are adjacent to each other on a second scan line.

5. The multicolor vector image processing device according to claim 1, further comprising an area ratio calculation unit to calculate an area ratio between a plurality of areas obtained by division of a boundary pixel by an outline based on the line information, wherein the coloring unit determines a color of a boundary pixel in accordance with a calculation result by the area ratio calculation unit.

6. The multicolor vector image processing device according to claim 1, further comprising a conversion unit to convert vector image data in accordance with a specified image size, wherein the detection unit detects a boundary pixel based on the vector image data converted by the conversion unit, and the longitudinally passing determination unit determines whether or not each boundary pixel is longitudinally passed through by an outline based on the vector image data converted by the conversion unit.

7. A method for multicolor vector image processing, performed by a computer, the method comprising:

analyzing, using a processor, vector image data including line information defining an outline and area color information defining a first color and a second color respectively for two areas adjacent to each other across the outline;

detecting, using the processor, a boundary pixel through which an outline passes based on the line information;

determining, using the processor, whether or not the outline passes longitudinally through the boundary pixel; and sequentially coloring, using the processor, each pixel on a scan line, wherein the processor calculates a color of a target pixel based on the area color information and fills the target pixel with the calculated color when the target pixel is a boundary pixel through which an outline does not pass longitudinally, the processor calculates a color of a target pixel based on the area color information, fills the target pixel with the calculated color, and changes a reference filling color from the first color to the second color defined for the target pixel when the target pixel is a boundary pixel through which an outline passes longitudinally, and the processor fills a target pixel with the reference filling color when the target pixel is not a boundary pixel.

8. A non-transitory computer readable medium for storing a computer program which enables a computer to perform a multicolor vector image processing method, the method comprising:

analyzing vector image data including line information defining an outline and area color information defining a first color and a second color respectively for two areas adjacent to each other across the outline;

detecting a boundary pixel through which an outline passes based on the line information;

determining whether or not the outline passes longitudinally through the boundary pixel; and sequentially coloring each pixel on a scan line, wherein a color of a target pixel is calculated based on the area color information and the target pixel is filled with the calculated color when the target pixel is a boundary pixel through which an outline does not pass longitudinally, a color of a target pixel is calculated based on the area color information, the target pixel is filled with the calculated color, and a reference filling color is changed from the first color to the second color defined for the target pixel when the target pixel is a boundary pixel through which an outline passes longitudinally, a target pixel is filled with the reference filling color when the target pixel is not a boundary pixel.

* * * * *